US009616654B2

United States Patent
Kanungo et al.

(10) Patent No.: US 9,616,654 B2
(45) Date of Patent: *Apr. 11, 2017

(54) IMAGING MEMBER FOR OFFSET PRINTING APPLICATIONS

(75) Inventors: Mandakini Kanungo, Penfield, NY (US); Maryna Ornatska, Hightstown, NJ (US); David J. Gervasi, Pittsford, NY (US); Patrick J. Howe, Fairport, NY (US); Santokh S. Badesha, Pittsford, NY (US); Jack Lestrange, Macedon, NY (US); Matthew M. Kelly, West Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 774 days.

This patent is subject to a terminal disclaimer.

(21) Appl. No.: 13/601,892

(22) Filed: Aug. 31, 2012

(65) Prior Publication Data

US 2014/0060359 A1  Mar. 6, 2014

(51) Int. Cl.

| | | |
|---|---|---|
| *B41F 1/18* | (2006.01) | |
| *B41F 1/16* | (2006.01) | |
| *G02B 5/20* | (2006.01) | |
| *G02B 5/22* | (2006.01) | |
| *G03G 15/10* | (2006.01) | |
| *G03G 7/00* | (2006.01) | |
| *G03G 15/00* | (2006.01) | |

(52) U.S. Cl.
CPC ............... *B41F 1/16* (2013.01); *B41F 1/18* (2013.01); *G02B 5/208* (2013.01); *G02B 5/22* (2013.01); *G03G 7/0013* (2013.01); *G03G 7/0046* (2013.01); *G03G 15/101* (2013.01); *G03G 15/751* (2013.01)

(58) Field of Classification Search
None
See application file for complete search history.

(56) References Cited

U.S. PATENT DOCUMENTS

| | | |
|---|---|---|
| 3,741,118 A | 6/1973 | Carley |
| 3,800,699 A | 4/1974 | Carley |
| 3,877,372 A | 4/1975 | Leeds |
| 4,627,349 A | 12/1986 | Claussen |
| 4,887,528 A | 12/1989 | Ruge et al. |

(Continued)

FOREIGN PATENT DOCUMENTS

| | | |
|---|---|---|
| DE | 101 60 734 A1 | 7/2002 |
| DE | 103 60 108 A1 | 10/2004 |

(Continued)

OTHER PUBLICATIONS

European Search Report in corresponding related application EP 11 187 196.8 dated Mar. 30, 2012.

(Continued)

*Primary Examiner* — Blake A Tankersley
*Assistant Examiner* — Michael Robinson
(74) *Attorney, Agent, or Firm* — Prass LLP; Ellis B. Ramirez

(57) ABSTRACT

An imaging member includes a surface layer comprising a fluorosilicone and an infrared-absorbing filler. At least 75% of the siloxane units in the fluorosilicone are fluorinated. Methods of manufacturing the imaging member and processes for variably lithographic printing using the imaging member are also disclosed.

5 Claims, 4 Drawing Sheets

(56) References Cited

U.S. PATENT DOCUMENTS

| | | |
|---|---|---|
| 5,067,404 A | 11/1991 | Frunder et al. |
| 5,701,815 A | 12/1997 | Bocko et al. |
| 5,855,173 A | 1/1999 | Chatterjee et al. |
| 5,933,695 A * | 8/1999 | Henry et al. ............ 399/333 |
| 6,125,756 A | 10/2000 | Nüssel et al. |
| 6,146,798 A | 11/2000 | Bringans et al. |
| 6,318,264 B1 | 11/2001 | D'Heureuse et al. |
| 6,725,777 B2 | 4/2004 | Katano |
| 6,841,366 B1 | 1/2005 | Bower et al. |
| 7,020,355 B2 | 3/2006 | Lahann et al. |
| 7,061,513 B2 | 6/2006 | Katano et al. |
| 7,100,503 B2 | 9/2006 | Wiedemer et al. |
| 7,191,705 B2 | 3/2007 | Berg et al. |
| 8,347,787 B1 | 1/2013 | Stowe et al. |
| 2003/0009000 A1 * | 1/2003 | Singh et al. ............ 528/35 |
| 2003/0167950 A1 | 9/2003 | Mori |
| 2004/0011234 A1 | 1/2004 | Figov et al. |
| 2005/0178281 A1 | 8/2005 | Berg et al. |
| 2005/0258136 A1 | 11/2005 | Kawanishi et al. |
| 2006/0152566 A1 | 7/2006 | Taniuchi et al. |
| 2007/0199457 A1 | 8/2007 | Cyman, Jr. et al. |
| 2007/0199458 A1 | 8/2007 | Cyman, Jr. et al. |
| 2007/0199459 A1 | 8/2007 | Cyman, Jr. et al. |
| 2007/0199460 A1 | 8/2007 | Cyman, Jr. et al. |
| 2007/0199461 A1 | 8/2007 | Cyman, Jr. et al. |
| 2007/0199462 A1 | 8/2007 | Cyman, Jr. et al. |
| 2008/0011177 A1 | 1/2008 | Muraoka |
| 2008/0032072 A1 | 2/2008 | Taniuchi et al. |
| 2008/0223240 A1 | 9/2008 | Drury et al. |
| 2010/0031838 A1 | 2/2010 | Lewis et al. |
| 2010/0221429 A1 * | 9/2010 | Ahn ............ 427/256 |
| 2012/0103212 A1 | 5/2012 | Stowe et al. |
| 2012/0103213 A1 | 5/2012 | Stowe et al. |
| 2012/0103214 A1 | 5/2012 | Stowe et al. |
| 2012/0103217 A1 | 5/2012 | Stowe et al. |
| 2012/0103218 A1 | 5/2012 | Stowe et al. |
| 2012/0103219 A1 | 5/2012 | Stowe et al. |
| 2012/0103221 A1 | 5/2012 | Stowe et al. |
| 2012/0274914 A1 | 11/2012 | Stowe et al. |
| 2013/0032050 A1 | 2/2013 | Pattekar et al. |
| 2013/0033686 A1 | 2/2013 | Stowe et al. |
| 2013/0033687 A1 | 2/2013 | Stowe et al. |
| 2013/0033688 A1 | 2/2013 | Stowe et al. |

FOREIGN PATENT DOCUMENTS

| | | |
|---|---|---|
| DE | 10 2006 050744 A1 | 4/2008 |
| DE | 10 2008 062741 A1 | 7/2010 |
| EP | 1 935 640 A2 | 6/2008 |
| EP | 1 938 987 A2 | 7/2008 |
| EP | 1 964 678 A2 | 9/2008 |
| WO | 2006/133024 A2 | 12/2006 |
| WO | 2009/025821 A1 | 2/2009 |

OTHER PUBLICATIONS

European Search Report in corresponding related application EP 11 187 195.0 dated Mar. 28, 2012.
European Search Report in corresponding related application EP 11 187 193.5 dated Feb. 29, 2012.
European Search Report in corresponding related application EP 11 187 192.7 dated Feb. 28, 2012.
European Search Report in corresponding related application EP 11 187 191.9 dated Mar. 1, 2012.
European Search Report in corresponding related application EP 11 187 190.1 dated Mar. 12, 2012.
European Search Report in corresponding related application EP 11 187 189.3 dated Feb. 28, 2012.
Shen et al., "A new understanding on the mechanism of fountain solution in the prevention of ink transfer to the non-image area in conventional offset lithography", J. Adhesion Sci. Technol., vol. 18, No. 15-16, pp. 1861-1887 (2004).
Katano et al., "The New Printing System Using the Materials of Reversible Change of Wettability", International Congress of Imaging Science 2002, Tokyo, pp. 297 et seq. (2002).
Biegelsen, U.S. Appl. No. 13/366,947, filed Feb. 6, 2012.
Liu et al., U.S. Appl. No. 13/426,209, filed Mar. 21, 2012.
Liu et al., U.S. Appl. No. 13/426,262, filed Mar. 21, 2012.
Lestrange et al., U.S. Appl. No. 13/601,803, filed Aug. 31, 2012.
Hsieh, U.S. Appl. No. 13/601,817, filed Aug. 31, 2012.
Hsieh et al., U.S. Appl. No. 13/601,840, filed Aug. 31, 2012.
Kelly et al., U.S. Appl. No. 13/601,854, filed Aug. 31, 2012.
Liu, U.S. Appl. No. 13/601,876, filed Aug. 31, 2012.
Moorlag et al., U.S. Appl. No. 13/601,905, filed Aug. 31, 2012.
Gervasi et al., U.S. Appl. No. 13/601,920, filed Aug. 31, 2012.
Gervasi et al., U.S. Appl. No. 13/601,938, filed Aug. 31, 2012.
Gervasi et al., U.S. Appl. No. 13/601,956, filed Aug. 31, 2012.
Kanungo et al., U.S. Appl. No. 13/601,962, filed Aug. 31, 2012.

* cited by examiner

IMAGING MEMBER FOR OFFSET PRINTING APPLICATIONS

RELATED APPLICATIONS

The disclosure is related to U.S. patent application Ser. No. 13/095,714, filed on Apr. 27, 2011, titled "Variable Data Lithography System," the disclosure of which is incorporated herein by reference in its entirety. The disclosure is related to co-pending U.S. patent application Ser. No. 13/601,962, filed on the same day as the present disclosure, titled "Imaging Member for Offset Printing Applications," the disclosure of which is incorporated herein by reference in its entirety; co-pending U.S. patent application Ser. No. 13/601,956, filed on the same day as the present disclosure, titled "Imaging Member for Offset Printing Applications," the disclosure of which is incorporated herein by reference in its entirety; co-pending U.S. patent application Ser. No. 13/601,938, filed on the same day as the present disclosure, titled "Imaging Member for Offset Printing Applications," the disclosure of which is incorporated herein by reference in its entirety; co-pending U.S. patent application Ser. No. 13/601,920, filed on the same day as the present disclosure, titled "Imaging Member for Offset Printing Applications," the disclosure of which is incorporated herein by reference in its entirety; co-pending U.S. patent application Ser. No. 13/601,905, filed on the same day as the present disclosure, titled "Textured Imaging Member," the disclosure of which is incorporated herein by reference in its entirety; co-pending U.S. patent application Ser. No. 13/601,876, filed on the same day as the present disclosure, titled "Variable Lithographic Printing Process," the disclosure of which is incorporated herein by reference in its entirety; co-pending U.S. patent application Ser. No. 13/601,854, filed on the same day as the present disclosure, titled "Imaging Member for Offset Printing Applications," the disclosure of which is incorporated herein by reference in its entirety; co-pending U.S. patent application Ser. No. 13/601,840, filed on the same day as the present disclosure, titled "Printing Plates Doped With Release Oils," the disclosure of which is incorporated herein by reference in its entirety; co-pending U.S. patent application Ser. No. 13/601,817, filed on the same day as the present disclosure, titled "Imaging Member," the disclosure of which is incorporated herein by reference in its entirety; and co-pending U.S. patent application Ser. No. 13/601,803, filed on the same day as the present disclosure, titled "Methods and Systems for Ink-Based Digital Printing With Multi-Component, Multi-Functional Fountain Solution," the disclosure of which is incorporated herein by reference in its entirety.

FIELD OF DISCLOSURE

The present disclosure is related to imaging members having a surface layer as described herein. The imaging members are suitable for use in various marking and printing methods and systems, such as offset printing. The present disclosure permits methods and systems providing control of conditions local to the point of writing data to a reimageable surface in variable data lithographic systems. Methods of making and using such imaging members are also disclosed.

BACKGROUND

Offset lithography is a common method of printing today. The terms "printing" and "marking" are used interchangeably herein. In a typical lithographic process a printing plate, which may be a flat plate, the surface of a cylinder, or belt, etc., is formed to have "image regions" formed of a hydrophobic/oleophilic material, and "non-image regions" formed of a hydrophilic/oleophobic material. The image regions correspond to the areas on the final print (i.e., the target substrate) that are occupied by a printing or marking material such as ink, whereas the non-image regions correspond to the areas on the final print that are not occupied by said marking material. The hydrophilic regions accept and are readily wetted by a water-based fluid, commonly referred to as a dampening fluid or fountain fluid (typically consisting of water and a small amount of alcohol as well as other additives and/or surfactants to reduce surface tension). The hydrophobic regions repel dampening fluid and accept ink, whereas the dampening fluid formed over the hydrophilic regions forms a fluid "release layer" for rejecting ink. The hydrophilic regions of the printing plate thus correspond to unprinted areas, or "non-image areas", of the final print.

The ink may be transferred directly to a target substrate, such as paper, or may be applied to an intermediate surface, such as an offset (or blanket) cylinder in an offset printing system. The offset cylinder is covered with a conformable coating or sleeve with a surface that can conform to the texture of the target substrate, which may have surface peak-to-valley depth somewhat greater than the surface peak-to-valley depth of the imaging plate. Also, the surface roughness of the offset blanket cylinder helps to deliver a more uniform layer of printing material to the target substrate free of defects such as mottle. Sufficient pressure is used to transfer the image from the offset cylinder to the target substrate. Pinching the target substrate between the offset cylinder and an impression cylinder provides this pressure.

Typical lithographic and offset printing techniques utilize plates which are permanently patterned, and are therefore useful only when printing a large number of copies of the same image (i.e. long print runs), such as magazines, newspapers, and the like. However, they do not permit creating and printing a new pattern from one page to the next without removing and replacing the print cylinder and/or the imaging plate (i.e., the technique cannot accommodate true high speed variable data printing wherein the image changes from impression to impression, for example, as in the case of digital printing systems). Furthermore, the cost of the permanently patterned imaging plates or cylinders is amortized over the number of copies. The cost per printed copy is therefore higher for shorter print runs of the same image than for longer print runs of the same image, as opposed to prints from digital printing systems.

Accordingly, a lithographic technique, referred to as variable data lithography, has been developed which uses a non-patterned reimageable surface that is initially uniformly coated with a dampening fluid layer. Regions of the dampening fluid are removed by exposure to a focused radiation source (e.g., a laser light source) to form pockets. A temporary pattern in the dampening fluid is thereby formed over the non-patterned reimageable surface. Ink applied thereover is retained in the pockets formed by the removal of the dampening fluid. The inked surface is then brought into contact with a substrate, and the ink transfers from the pockets in the dampening fluid layer to the substrate. The dampening fluid may then be removed, a new uniform layer of dampening fluid applied to the reimageable surface, and the process repeated.

It would be desirable to identify alternate materials that are suitable for use for imaging members in variable data lithography.

BRIEF DESCRIPTION

The present disclosure relates to imaging members for digital offset printing applications. The imaging members have a surface layer made of a fluorosilicone and an infrared-absorbing filler. The fluorosilicone comprises siloxane units. At least about 75% of the siloxane units are fluorinated.

Disclosed in embodiments is an imaging member comprising a surface layer. The surface layer includes a fluorosilicone and an infrared-absorbing filler. At least 75% of siloxane units in the fluorosilicone are fluorinated.

The fluorosilicone may include amino-functional groups.

In some embodiments, the filler is present in an amount of from about 5 to about 20 weight percent. The filler may be selected from the group consisting of carbon black, iron oxide, carbon nanotubes, graphene, graphite, and carbon fibers. The filler may be iron oxide. In some embodiments, the filler has an average particle size of from about 2 nanometers to about 10 microns.

Also disclosed is a method of manufacturing an imaging member surface layer. The method includes depositing a surface layer composition upon a mold; and curing the surface layer at an elevated temperature. The surface layer composition comprises a fluorosilicone and an infrared-absorbing filler. At least 75% of siloxane units in the fluorosilicone are fluorinated.

The curing may be conducted at a temperature of from about 135° C. to about 165° C.

In some embodiments, the filler is selected from the group consisting of carbon black, iron oxide, carbon nanotubes, graphene, graphite, and carbon fibers.

The filler may be present in an amount of from about 5 to about 20 weight percent.

In some embodiments, the filler has an average particle size of from about 2 nanometers to about 10 microns.

Optionally, the surface layer composition comprises a catalyst. The catalyst may be a platinum catalyst.

In some embodiments, the mold includes a parylene release layer.

The cured surface layer may have a thickness of from about 0.5 microns to about 4 millimeters.

Also disclosed is a process for variable lithographic printing. The process includes applying a fountain solution to an imaging member surface; forming a latent image by evaporating the fountain solution from selective locations on the imaging member surface to form hydrophobic non-image areas and hydrophilic image areas; developing the latent image by applying an ink composition to the hydrophilic image areas; and transferring the developed latent image to a receiving substrate. The imaging member surface comprises a fluorosilicone and an infrared-absorbing filler. At least 75% of siloxane units in the fluorosilicone are fluorinated.

In some embodiments, the fountain solution comprises a siloxane compound. The siloxane compound may be octamethylcyclotetrasiloxane.

The filler may selected from the group consisting of carbon black, iron oxide, carbon nanotubes, graphene, graphite, and carbon fibers. In some embodiments, the filler is iron oxide.

These and other non-limiting aspects and/or objects of the disclosure are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
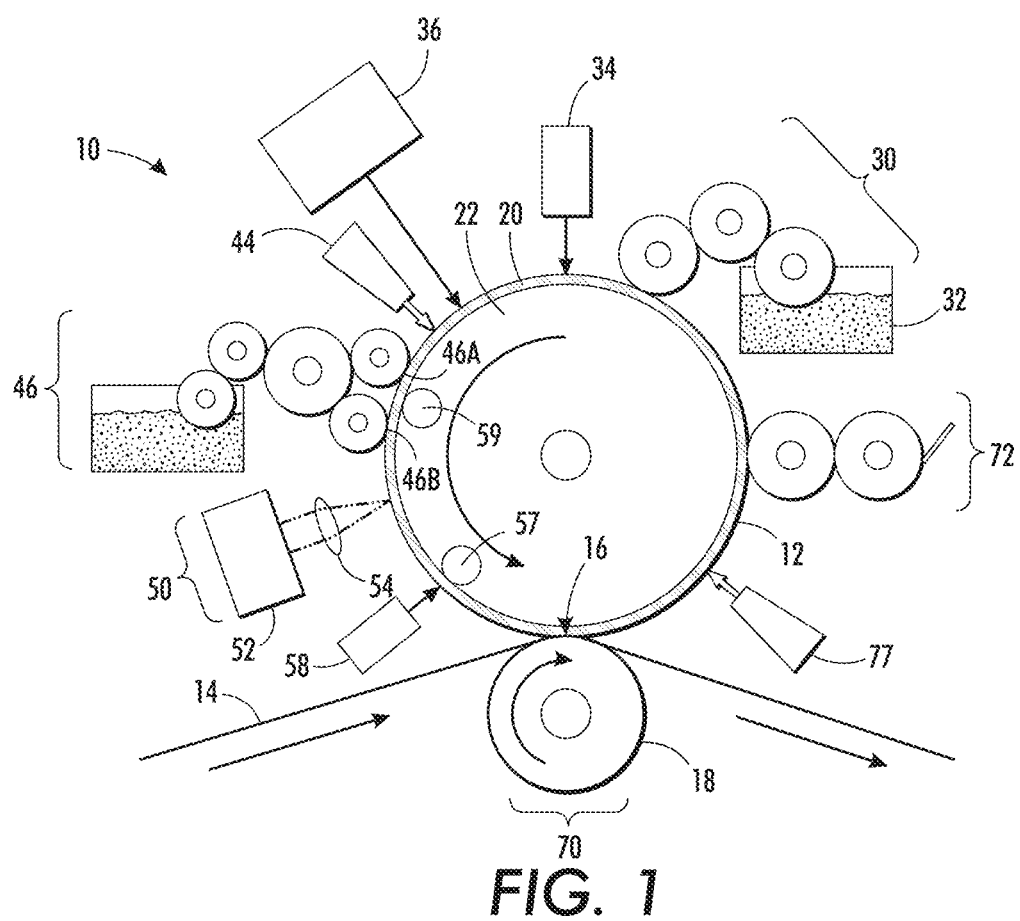
FIG. 1 illustrates a variable lithographic printing apparatus in which the dampening fluids of the present disclosure may be used.

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

FIG. 1 illustrates a system for variable lithography in which the ink compositions of the present disclosure may be used. The system 10 comprises an imaging member 12. The imaging member comprises a substrate 22 and a reimageable surface layer 20. The surface layer is the outermost layer of the imaging member, i.e. the layer of the imaging member furthest from the substrate. As shown here, the substrate 22 is in the shape of a cylinder; however, the substrate may also be in a belt form, etc. Note that the surface layer is usually a different material compared to the substrate, as they serve different functions.

In the depicted embodiment the imaging member 12 rotates counterclockwise and starts with a clean surface. Disposed at a first location is a dampening fluid subsystem 30, which uniformly wets the surface with dampening fluid 32 to form a layer having a uniform and controlled thickness. Ideally the dampening fluid layer is between about 0.15 micrometers and about 1.0 micrometers in thickness, is uniform, and is without pinholes. As explained further below, the composition of the dampening fluid aids in leveling and layer thickness uniformity. A sensor 34, such as an in-situ non-contact laser gloss sensor or laser contrast sensor, is used to confirm the uniformity of the layer. Such a sensor can be used to automate the dampening fluid subsystem 30.

At optical patterning subsystem 36, the dampening fluid layer is exposed to an energy source (e.g. a laser) that selectively applies energy to portions of the layer to imagewise evaporate the dampening fluid and create a latent "negative" of the ink image that is desired to be printed on the receiving substrate. Image areas are created where ink is desired, and non-image areas are created where the dampening fluid remains. An optional air knife 44 is also shown here to control airflow over the surface layer 20 for the purpose of maintaining clean dry air supply, a controlled air temperature, and reducing dust contamination prior to inking. Next, an ink composition is applied to the imaging member using inker subsystem 46. Inker subsystem 46 may consist of a "keyless" system using an anilox roller to meter an offset ink composition onto one or more forming rollers 46A, 46B. The ink composition is applied to the image areas to form an ink image.

A rheology control subsystem 50 partially cures or tacks the ink image. This curing source may be, for example, an ultraviolet light emitting diode (UV-LED) 52, which can be focused as desired using optics 54. Another way of increasing the cohesion and viscosity employs cooling of the ink composition. This could be done, for example, by blowing cool air over the reimageable surface from jet 58 after the ink composition has been applied but before the ink composition is transferred to the final substrate. Alternatively, a heating element 59 could be used near the inker subsystem 46 to maintain a first temperature and a cooling element 57 could be used to maintain a cooler second temperature near the nip 16.

The ink image is then transferred to the target or receiving substrate 14 at transfer subsystem 70. This is accomplished by passing a recording medium or receiving substrate 14, such as paper, through the nip 16 between the impression roller 18 and the imaging member 12.

Finally, the imaging member should be cleaned of any residual ink or dampening fluid. Most of this residue can be easily removed quickly using an air knife 77 with sufficient air flow. Removal of any remaining ink can be accomplished at cleaning subsystem 72.

The imaging member surface generally has a tailored topology. Put another way the surface has a micro-roughened surface structure to help retain fountain solution/dampening fluid in the non-image areas. These hillocks and pits that make up the surface enhance the static or dynamic surface energy forces that attract the fountain solution to the surface. This reduces the tendency of the fountain solution to be forced away from the surface by roller nip action. The imaging member plays multiple roles in the variable data lithography printing process, which include: (1) wetting with the fountain solution, (2) creation of the latent image, (3) inking with the offset ink, and (4) enabling the ink to lift off and be transferred to the receiving substrate. Some desirable qualities for the imaging member, particularly its surface, include high tensile strength to increase the useful service lifetime of the imaging member. The surface layer should also weakly adhere to the ink, yet be wettable with the ink, to promote both uniform inking of image areas and to promote subsequent transfer of the ink from the surface to the receiving substrate. Finally, some solvents have such a low molecular weight that they inevitably cause some swelling of the imaging member surface layer. Wear can proceed indirectly under these swell conditions by causing the release of near infrared laser energy-absorbing particles at the imaging member surface, which then act as abrasive particles. Desirably, the imaging member surface layer has a low tendency to be penetrated by solvent.

The imaging members of the present disclosure include a surface layer that meets these requirements. The surface layer 20 of the present disclosure includes a fluorosilicone and an infrared-absorbing filler.

The term "fluorosilicone" as used herein refers to polyorganosiloxanes having a backbone formed from silicon and oxygen atoms and sidechains containing carbon, hydrogen, and fluorine atoms. At least one fluorine atom is present in the sidechain. The sidechains can be linear, branched, cyclic, or aromatic. The fluorosilicone may also contain functional groups, such as amino groups, which permit addition crosslinking. When the crosslinking is complete, such groups become part of the backbone of the overall fluorosilicone. Fluorosilicones are commercially available, for example CF1-3510 from NuSil.

In the fluorosilicones of the present disclosure, at least 75% of the siloxane units are fluorinated. The percentage of fluorinated siloxane units can be determined by considering that each silicon atom contains two possible sidechains. The percentage is calculated as the number of sidechains having at least one fluorine atom divided by the total number of sidechains (i.e. twice the number of silicon atoms).

The infrared-absorbing filler is able to absorb energy from the infra-red portion of the spectrum (having a wavelength of from about 750 nm to about 1000 nm). This aids in efficient evaporation of the fountain solution. In embodiments, the infrared-absorbing filler may be carbon black, a metal oxide such as iron oxide (FeO), carbon nanotubes, graphene, graphite, or carbon fibers. The filler may have an average particle size of from about 2 nanometers to about 10 microns.

The infrared-absorbing filler may make up from about 5 to about 20 weight percent of the surface layer, including from about 7 to about 15 weight percent. The silicone rubber may make up from about 80 to about 95 weight percent of the surface layer, including from about 85 to about 93 weight percent.

If desired, the surface layer may also include other fillers, such as silica. Silica can help increase the tensile strength of the surface layer and increase wear resistance. Silica may be present in an amount of from about 2 to about 30 weight percent of the surface layer, including from about 5 to about 30 weight percent.

The surface layer may have a thickness of from about 0.5 microns (μm) to about 4 millimeters (mm), depending on the requirements of the overall printing system.

The present disclosure contemplates methods of manufacturing the imaging member surface layer. The method includes depositing a surface layer composition upon a mold; and curing the surface layer composition at an elevated temperature. The surface layer composition comprises a fluorosilicone and an infrared-absorbing filler. The curing may be performed at an elevated temperature of from about 135° C. to about 165° C. This elevated temperature is in contrast to room temperature. The curing may occur for a time period of from about 15 minutes to about 3 hours. The surface layer composition may further comprise a catalyst, such as a platinum catalyst.

Further disclosed are processes for variable lithographic printing. The processes include applying a fountain solution/dampening fluid to an imaging member comprising an imaging member surface. A latent image is formed by evaporating the fountain solution from selective locations on the imaging member surface to form hydrophobic non-image areas and hydrophilic image areas; developing the latent image by applying an ink composition to the hydrophilic image areas; and transferring the developed latent image to a receiving substrate. The imaging member surface comprises a fluorosilicone and an infrared-absorbing filler.

The present disclosure contemplates a system where the dampening fluid is hydrophobic (i.e. non-aqueous) and the ink somewhat hydrophilic (having a small polar component). This system can be used with the imaging member surface layer of the present disclosure. Generally speaking, the variable lithographic system can be described as comprising an ink composition, a dampening fluid, and an imaging member surface layer, wherein the dampening fluid has a surface energy alpha-beta coordinate which is within the circle connecting the alpha-beta coordinates for the surface energy of the ink and the surface energy of the imaging member surface layer. In particular embodiments, the dampening fluid has a total surface tension greater than 10 dynes/cm and less than 75 dynes/cm with a polar component of less than 50 dynes/cm. In some more specific embodiments, the dampening fluid has a total surface tension greater than 15 dynes/cm and less than 30 dynes/cm with a polar component of less than 5 dynes/cm. The imaging member surface layer may have a surface tension of less than 30 dynes/cm with a polar component of less than 2 dynes/cm.

By choosing the proper chemistry, it is possible to devise a system where both the ink and the dampening fluid will wet the imaging member surface, but the ink and the dampening fluid will not mutually wet each other. The system can also be designed so that it is energetically favorable for dampening fluid in the presence of ink residue to actually lift the ink residue off of the imaging member surface by having a higher affinity for wetting the surface in the presence of the ink. In other words, the dampening fluid could remove microscopic background defects (e.g. <1 µm radius) from propagating in subsequent prints.

The dampening fluid should have a slight positive spreading coefficient so that the dampening fluid wets the imaging member surface. The dampening fluid should also maintain a spreading coefficient in the presence of ink, or in other words the dampening fluid has a closer surface energy value to the imaging member surface than the ink does. This causes the imaging member surface to value wetting by the dampening fluid compared to the ink, and permits the dampening fluid to lift off any ink residue and reject ink from adhering to the surface where the laser has not removed dampening fluid. Next, the ink should wet the imaging member surface in air with a roughness enhancement factor (i.e. when no dampening fluid is present on the surface). It should be noted that the surface may have a roughness of less than 1 µm when the ink is applied at a thickness of 1 to 2 µm. Desirably, the dampening fluid does not wet the ink in the presence of air. In other words, fracture at the exit inking nip should occur where the ink and the dampening fluid interface, not within the dampening fluid itself. This way, dampening fluid will not tend to remain on the imaging member surface after ink has been transferred to a receiving substrate. Finally, it is also desirable that the ink and dampening fluid are chemically immiscible such that only emulsified mixtures can exist. Though the ink and the dampening fluid may have alpha-beta coordinates close together, often choosing the chemistry components with different levels of hydrogen bonding can reduce miscibility by increasing the difference in the Hanson solubility parameters.

The role of the dampening fluid is to provide selectivity in the imaging and transfer of ink to the receiving substrate. When an ink donor roll in the ink source of FIG. 1 contacts the dampening fluid layer, ink is only applied to areas on the imaging member that are dry, i.e. not covered with dampening fluid.

It is contemplated that the dampening fluid which is compatible with the ink compositions of the present disclosure is a volatile hydrofluoroether (HFE) liquid or a volatile silicone liquid. These classes of fluids provides advantages in the amount of energy needed to evaporate, desirable characteristics in the dispersive/polar surface tension design space, and the additional benefit of zero residue left behind once evaporated. The hydrofluoroether and silicone are liquids at room temperature, i.e. 25° C.

In specific embodiments, the volatile hydrofluoroether liquid has the structure of Formula (I):

$$C_mH_pF_{2m+1-p}—O—C_nH_qF_{2n+1-q} \quad \text{Formula (I)}$$

wherein m and n are independently integers from 1 to about 9; and p and q are independently integers from 0 to 19. As can be seen, generally the two groups bound to the oxygen atom are fluoroalkyl groups.

In particular embodiments, q is zero and p is non-zero. In these embodiments, the right-hand side of the compound of Formula (I) becomes a perfluoroalkyl group. In other embodiments, q is zero and p has a value of 2 m+1. In these embodiments, the right-hand side of the compound of Formula (I) is a perfluoroalkyl group and the left-hand side of the compound of Formula (I) is an alkyl group. In still other embodiments, both p and q are at least 1.

The term "alkyl" as used herein refers to a radical which is composed entirely of carbon atoms and hydrogen atoms which is fully saturated. The alkyl radical may be linear, branched, or cyclic. Linear alkyl radicals generally have the formula $—C_nH_{2n+1}$.

In this regard, the term "fluoroalkyl" as used herein refers to a radical which is composed entirely of carbon atoms and hydrogen atoms, in which one or more hydrogen atoms may be (i.e. are not necessarily) substituted with a fluorine atom, and which is fully saturated. The fluoroalkyl radical may be linear, branched, or cyclic. It should be noted that an alkyl group is a subset of fluoroalkyl groups.

The term "perfluoroalkyl" as used herein refers to a radical which is composed entirely of carbon atoms and fluorine atoms which is fully saturated and of the formula $—C_nF_{2n+1}$. The perfluoroalkyl radical may be linear, branched, or cyclic. It should be noted that a perfluoroalkyl group is a subset of fluoroalkyl groups, and cannot be considered an alkyl group.

In particular embodiments, the hydrofluoroether has the structure of any one of Formulas (I-a) through (I-h):

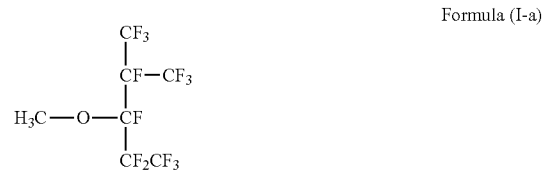

Formula (I-a)

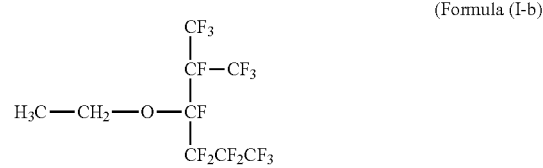

(Formula (I-b))

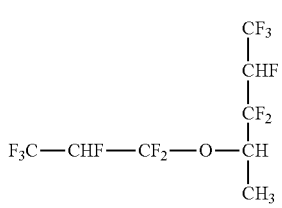
Formula (I-c)

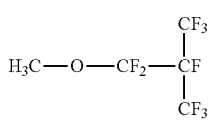
(Formula (I-d))

H₃C—O—CF₂CF₂CF₂CF₃    Formula (I-e)

H₃C—O—CF₂CF₂CF₃    (Formula (I-f))

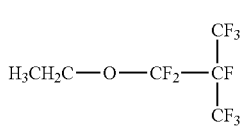
Formula (I-g)

H₃CH₂O—O—CF₂CF₂CF₂CF₃.    Formula (I-h)

Of these formulas, Formulas (I-a), (I-b), (I-d), (I-e), (I-f), (I-g), and (I-h) have one alkyl group and one perfluoroalkyl group, either branched or linear. In some terminology, they are also called segregated hydrofluoroethers. Formula (I-c) contains two fluoroalkyl groups and is not considered a segregated hydrofluoroether.

Formula (I-a) is also known as 1,1,1,2,2,3,4,5,5,5-decafluoro-3-methoxy-4-(trifluoromethyl)pentane and has CAS#132182-92-4. It is commercially available as Novec™ 7300.

Formula (I-b) is also known as 3-ethoxy-1,1,1,2,3,4,4,5,5,6,6,6-dodecafluoro-2-(trifluoromethyl)hexane and has CAS#297730-93-9. It is commercially available as Novec™ 7500.

Formula (I-c) is also known as 1,1,1,2,3,3-Hexafluoro-4-(1,1,2,3,3,3-hexafluoropropoxy)pentane and has CAS#870778-34-0. It is commercially available as Novec™ 7600.

Formula (I-d) is also known as methyl nonafluoroisobutyl ether and has CAS#163702-08-7. Formula (I-e) is also known as methyl nonafluorobutyl ether and has CAS#163702-07-6. A mixture of Formulas (I-d) and (I-e) is commercially available as Novec™ 7100. These two isomers are inseparable and have essentially identical properties.

Formula (I-f) is also known as 1-methoxyheptafluoropropane or methyl perfluoropropyl ether, and has CAS#375-03-1. It is commercially available as Novec™ 7000.

Formula (I-g) is also known as ethyl nonafluoroisobutyl ether and has CAS#163702-05-4. Formula (I-h) is also known as ethyl nonafluorobutyl ether and has CAS#163702-06-5. A mixture of Formulas (I-g) and (I-h) is commercially available as Novec™ 7200 or Novec™ 8200. These two isomers are inseparable and have essentially identical properties.

It is also possible that similar compounds having a cyclic aromatic backbone with perfluoroalkyl sidechains can be used. In particular, compounds of Formula (A) are contemplated:

Ar—(C$_k$F$_{2k+1}$)$_t$    Formula (A)

wherein Ar is an aryl or heteroaryl group; k is an integer from 1 to about 9; and t indicates the number of perfluoroalkyl sidechains, t being from 1 to about 8.

The term "heteroaryl" refers to a cyclic radical composed of carbon atoms, hydrogen atoms, and a heteroatom within a ring of the radical, the cyclic radical being aromatic. The heteroatom may be nitrogen, sulfur, or oxygen. Exemplary heteroaryl groups include thienyl, pyridinyl, and quinolinyl. When heteroaryl is described in connection with a numerical range of carbon atoms, it should not be construed as including substituted heteroaromatic radicals. Note that heteroaryl groups are not a subset of aryl groups.

Hexafluoro-m-xylene (HFMX) and hexafluoro-p-xylene (HFPX) are specifically contemplated as being useful compounds of Formula (A) that can be used as low-cost dampening fluids. HFMX and HFPX are illustrated below as Formulas (A-a) and (A-b):

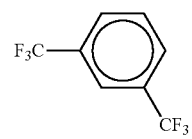
Formula (A-a)

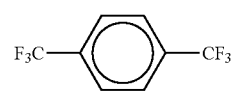
Formula (A-b)

It should be noted any co-solvent combination of fluorinated damping fluids can be used to help suppress non-desirable characteristics such as a low flammability temperature.

Alternatively, the dampening fluid solvent is a volatile silicone liquid. In some embodiments, the volatile silicone liquid is a linear siloxane having the structure of Formula (II):

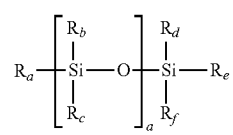
Formula (II)

wherein $R_a$, $R_b$, $R_c$, $R_d$, $R_e$, and $R_f$ are each independently hydrogen, alkyl, or perfluoroalkyl; and a is an integer from 1 to about 5. In some specific embodiments, $R_a$, $R_b$, $R_c$, $R_d$, $R_e$, and $R_f$ are all alkyl. In more specific embodiments, they are all alkyl of the same length (i.e. same number of carbon atoms).

Exemplary compounds of Formula (II) include hexamethyldisiloxane and octamethyltrisiloxane, which are illustrated below as Formulas (II-a) and (II-b):

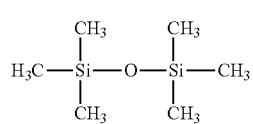
Formula (II-a)

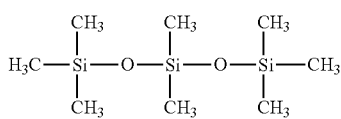

Formula (II-b)

In other embodiments, the volatile silicone liquid is a cyclosiloxane having the structure of Formula (III):

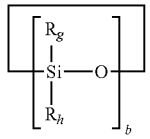

Formula (III)

wherein each $R_g$ and $R_h$ is independently hydrogen, alkyl, or perfluoroalkyl; and b is an integer from 3 to about 8. In some specific embodiments, all of the $R_g$ and $R_h$ groups are alkyl. In more specific embodiments, they are all alkyl of the same length (i.e. same number of carbon atoms).

Exemplary compounds of Formula (III) include octamethylcyclotetrasiloxane (aka D4) and decamethylcyclopentasiloxane (aka D5), which are illustrated below as Formulas (III-a) and (III-b):

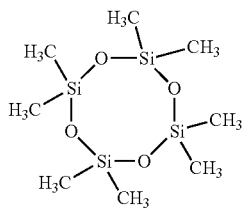

Formula (III-a)

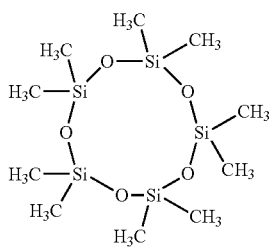

Formula (III-b)

In other embodiments, the volatile silicone liquid is a branched siloxane having the structure of Formula (IV):

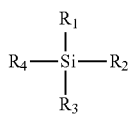

Formula (IV)

wherein $R_1$, $R_2$, $R_3$, and $R_4$ are independently alkyl or —$OSiR_1R_2R_3$.

An exemplary compound of Formula (IV) is methyl trimethicone, also known as methyltris(trimethylsiloxy)silane, which is commercially available as TMF-1.5 from Shin-Etsu, and shown below with the structure of Formula (IV-a):

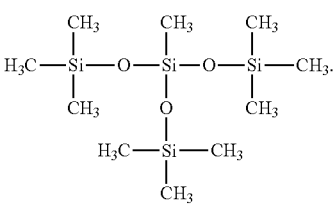

Formula (IV-a)

Any of the above described hydrofluoroethers/perfluorinated compounds are miscible with each other. Any of the above described silicones are also miscible with each other. This allows for the tuning of the dampening fluid for optimal print performance or other characteristics, such as boiling point or flammability temperature. Combinations of these hydrofluoroether and silicone liquids are specifically contemplated as being within the scope of the present disclosure. It should also be noted that the silicones of Formulas (II), (III), and (IV) are not considered to be polymers, but rather discrete compounds whose exact formula can be known.

In particular embodiments, it is contemplated that the dampening fluid comprises a mixture of octamethylcyclotetrasiloxane (D4) and decamethylcyclopentasiloxane (D5). Most silicones are derived from D4 and D5, which are produced by the hydrolysis of the chlorosilanes produced in the Rochow process. The ratio of D4 to D5 that is distilled from the hydrolysate reaction is generally about 85% D4 to 15% D5 by weight, and this combination is an azeotrope.

In particular embodiments, it is contemplated that the dampening fluid comprises a mixture of octamethylcyclotetrasiloxane (D4) and hexamethylcyclotrisiloxane (D3), the D3 being present in an amount of up to 30% by total weight of the D3 and the D4. The effect of this mixture is to lower the effective boiling point for a thin layer of dampening fluid.

These volatile hydrofluoroether liquids and volatile silicone liquids have a low heat of vaporization, low surface tension, and good kinematic viscosity. In particular, it should be noted that the fluorosilicone in the imaging member surface layer of the present disclosure does not swell when D4 is used as the fountain solution, and shows excellent wetting with D4.

The ink compositions contemplated for use with the present disclosure generally include a colorant and a plurality of selected curable compounds. The curable compounds can be cured under ultraviolet (UV) light to fix the ink in place on the final receiving substrate. As used herein, the term "colorant" includes pigments, dyes, quantum dots, mixtures thereof, and the like. Dyes and pigments have specific advantages. Dyes have good solubility and dispersibility within the ink vehicle. Pigments have excellent thermal and light-fast performance. The colorant is present in the ink composition in any desired amount, and is typically present in an amount of from about 10 to about 40 weight percent (wt %), based on the total weight of the ink composition, or from about 20 to about 30 wt %. Various pigments and dyes are known in the art, and are commercially available from suppliers such as Clariant, BASF, and Ciba, to name just a few.

The ink compositions may have a viscosity of from about 5,000 to about 300,000 centipoise at 25° C. and a shear rate of 5 sec$^{-1}$, including a viscosity of from about 15,000 to about 250,000 cps. The ink compositions may have a viscosity of from about 2,000 to about 90,000 centipoise at 25° C. and a shear rate of 50 sec$^{-1}$, including a viscosity of from about 5,000 to about 65,000 cps. The shear thinning index, or SHI, is defined in the present disclosure as the ratio of the viscosity of the ink composition at two different shear rates, here 50 sec$^{-1}$ and 5 sec$^{-1}$. This may be abbreviated as SHI (50/5). The SHI (50/5) may be from about 0.10 to about 0.60 for the ink compositions of the present disclosure, including from about 0.35 to about 0.55. These ink compositions may also have a surface tension of at least about 25 dynes/cm at 25° C., including from about 25 dynes/cm to about 40 dynes/cm at 25° C. These ink compositions possess many desirable physical and chemical properties. They are compatible with the materials with which they will come into contact, such as the dampening fluid, the surface layer of the imaging member, and the final receiving substrate. They also have the requisite wetting and transfer properties. They can be UV-cured and fixed in place. They also have a good viscosity; conventional offset inks usually have a viscosity above 50,000 cps, which is too high to use with nozzle-based inkjet technology. In addition, one of the most difficult issues to overcome is the need for cleaning and waste handling between successive digital images to allow for digital imaging without ghosting of previous images. These inks are designed to enable very high transfer efficiency instead of ink splitting, thus overcoming many of the problems associated with cleaning and waste handling. The ink compositions of the present disclosure do not gel, whereas regular offset inks made by simple blending do gel and cannot be used due to phase separation.

Aspects of the present disclosure may be further understood by referring to the following examples. The examples are illustrative, and are not intended to be limiting embodiments thereof.

EXAMPLES

Example 1

CF1-3510 (commercially available from Nusil), a two component, pourable fluorosilicone elastomer that is thermally curable, was loaded into a ball milling jar with black iron oxide particles, a solvent, and a ball milling media. The material was tumble milled for a period of from 14 to 16 hours. The milled material was removed and a catalyst was added. The material contained 10 wt % of iron oxide (FeO). The composition comprising the fluorosilicone and iron oxide particles was deposited on a textured, parylene coated mold (Agfa) to form the imaging member plate. The imaging member plate had a smooth side and a rough side (i.e. microtextured). The plate was then thermally cured at 150° C. for one hour. The filler-loaded, crosslinked composition was removed from the mold.

As a Comparative Example, a corresponding plate was made using a silicone available from Toray. This plate contained 10 wt % of carbon black (CB). The Toray silicone was a dimethyl-substituted silicone, and contained no fluorine.

The two plates (CF1-3510 and Comparative Example) were compared for surface texture, fountain solution wetting/dewetting, and ink release.

Figure 2:
FIG. 2 is a scanning electron micrograph of a fluorosilicone coated on a mold, and used to prepare a CF1-3510 plate.

FIG. 2 is a scanning electron micrograph (SEM) of the fluorosilicone coated on an Agfa mold. FIG. 2 shows the surface morphology of the finished plate. The surface texture enables improved wetting and inking.

Next, the fluorosilicone-coated plate was wetted with octamethylcyclotetrasiloxane (D4) fountain solution. The results were compared to the Comparative Example when wetted using NOVEC 7600 fountain solution. The results are presented in Table 1 (below). "CA" is an abbreviation for contact angle. The margin of error is included in parentheses.

TABLE 1

| Imaging Plate | Filler | Fountain Solution | Advancing CA of rough side | Receding CA of rough side |
|---|---|---|---|---|
| Comparative Example | 10% CB | NOVEC 7600 | 8.1 (1.1) | Does not recede |
| CF1-3510 | 10% FeO | D4 | <5 | Does not recede |

In both cases, the receding angle was zero, which indicated that the fountain solution was pinned to the surface. This excellent wetting behavior of D4 on the fluorosilicone surface achieves better image quality, for example, during the pull back effect of fountain solution during laser evaporation.

Next, an inking and background study was carried out for the two imaging plates by hand using an experimental proprietary bench fixture. The ink composition used was C11 ink, which is a proprietary designation for an acrylate based ink. The viscosities were modeled at 25° C. at a shear rate of 5 Hz or 50 Hz, and are reported in units of centipoise. The shear thinning index, or SHI, is the ratio of the viscosity of the ink composition at two different shear rates, here 50 Hz and 5 Hz. This may be abbreviated as SHI (50/5). Several properties of the ink are listed in Table 2:

TABLE 2

| Viscosity (5 Hz) | 26,773 |
| Viscosity (50 Hz) | 10,803 |
| SHI (50/5) | 0.40 |

D4 was used as the fountain solution.

Figure 3:
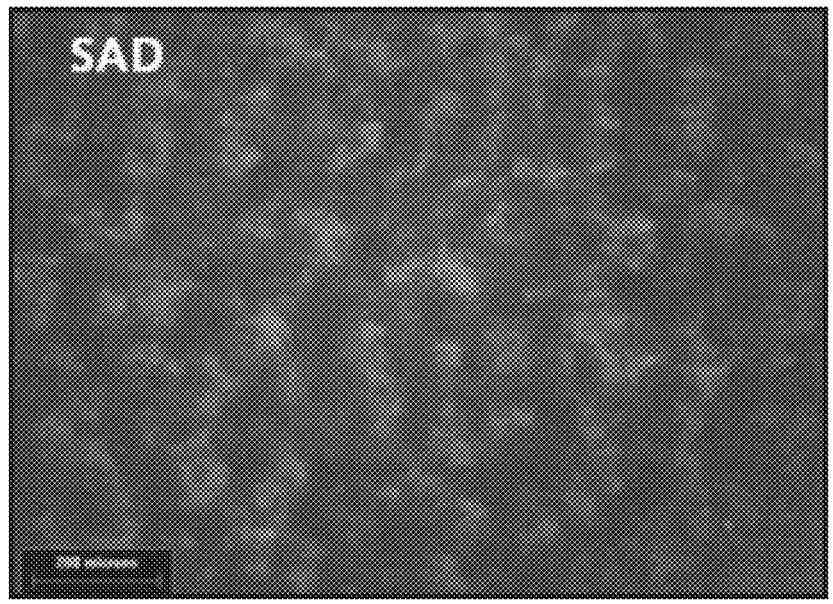
FIG. 3 is a picture showing a Comparative Example after solid area development.

FIG. 3 shows the Comparative Example after solid area development (i.e. a 100% solid image print).

Figure 4:
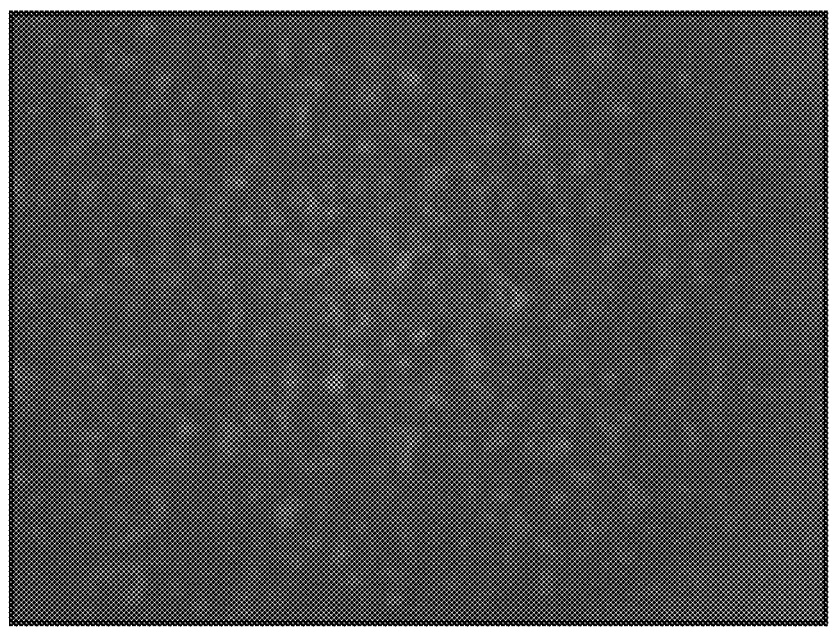
FIG. 4 is a picture showing the CF1-3510 plate after solid area development.

FIG. 4 shows the CF1-3510 plate after solid area development.

Figure 5:
FIG. 5 is a picture showing the background of the Comparative Example.

FIG. 5 shows the background of the Comparative Example (i.e. the non-image area).

Figure 6:
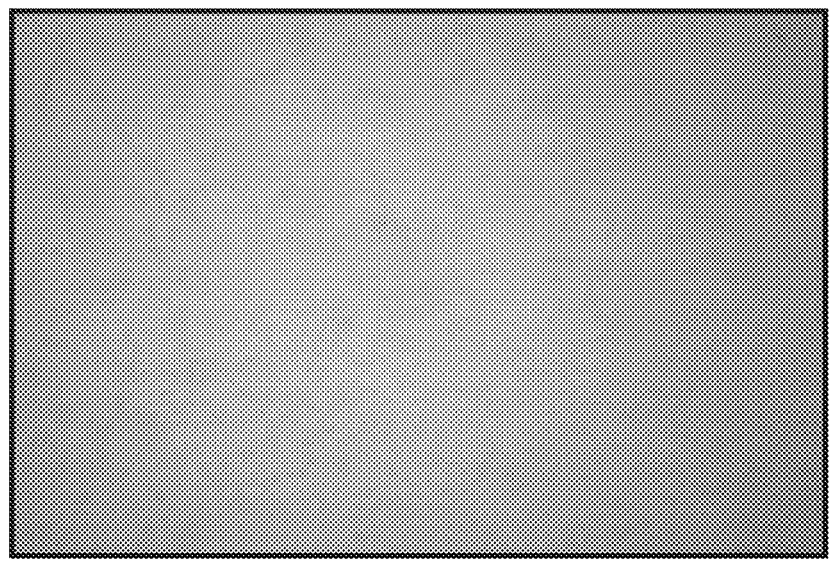
FIG. 6 is a picture showing the background of the CF1-3510 plate.

FIG. 6 shows the background of the CF1-3510 plate.

The CF1-3510 plate exhibited better inking than the Comparative Example, as seen in standard solid area development (SAD) inking tests as shown in FIGS. 3 and 4. SAD refers to a 100% solid image print whereas background refers to any ink in the non-image area. The backgrounds of the CF1-3510 plate and the Comparative Example were comparable as illustrated in FIGS. 5 and 6. Transfer efficiency between the two materials was comparable. Transfer efficiency is the measure of the quantity of ink that is transferred to the media (e.g. paper) divided by the total amount of ink applied to the image plate.

The study illustrated that the CF1-3510 imaging plate exhibited good ink accepting capability that was comparable to that of the Comparative Example. The transfer efficiency was calculated to be about 90% for the fluorosilicone composition of the present disclosure (i.e. CF1-3510). The background was very good for the CF1-3510 plate as well.

The present disclosure has been described with reference to exemplary embodiments. Modifications and alterations will occur to others upon reading and understanding the preceding detailed description. It is intended that the present disclosure be construed as including all such modifications and alterations insofar as they come within the scope of the appended claims or the equivalents thereof.

What is claimed is:

1. A variable data lithography system comprising:
   an imaging member comprising a surface layer at the outermost layer of the imaging member, wherein the surface layer includes a fluorosilicone and an infrared-absorbing filler consisting of energy absorbing particles;
   wherein the infrared-absorbing filler when exposed to an infra-red portion of a laser source supports evaporation of the dampening solution on the surface layer of the imaging member;
   wherein the infrared-absorbing filler is selected from the group consisting of carbon black, iron oxide, carbon nanotubes, graphene, graphite, and carbon fibers;
   a dampening fluid subsystem to uniformly wet the imaging member with a dampening solution to form a layer having a uniform and controlled thickness and an optical patterning subsystem that selectively applies energy to portions of the layer to image-wise evaporate the dampening solution;
   wherein the dampening solution comprises a mixture of octamethylcyclotetrasiloxane (D4) and decamethylcyclopentasiloxane (D5);
   wherein the fluorosilicone comprises siloxane units;
   wherein at least 75% of the siloxane units are fluorinated;
   wherein the optical patterning subsystem uses the laser source to image-wise evaporate the dampening solution and create a latent negative of an ink image that is desired to be printed on a receiving substrate in the variable data lithography system;
   wherein the infrared-absorbing filler is able to absorb energy from the laser source with wavelength of from about 750 nm to about 1000 nm;
   wherein the infrared-absorbing filler has an average particle size of 2 nanometers to 10 microns;
   wherein the infrared-absorbing filler is present in an amount from 5 to 20 weight percent of the surface layer;
   wherein the fluorosilicone includes amino-functional groups.

2. The imaging member of claim 1,
   wherein the dampening solution is a volatile hydrofluoroether liquid having a structure of:

$$C_mH_pF_{2m+1-p}\text{—}O\text{—}C_nH_qF_{2n+1-q}$$

where m and n are independently integers from 1 to about 9; and p and q are independently integers from 0 to 19.

3. The imaging member of claim 1, wherein the laser source and the infrared-absorbing filler form pockets on the dampening solution.

4. The imaging member of claim 1, wherein the infrared-absorbing filler is iron oxide.

5. The imaging member of claim 1, wherein the surface layer has a thickness of from about 0.5 microns to about 4 millimeters.

* * * * *